United States Patent [19]

Burns

[11] Patent Number: 4,754,981
[45] Date of Patent: Jul. 5, 1988

[54] UNITIZED FACE SEALING DEVICE

[75] Inventor: Michael P. H. Burns, Windsor, England

[73] Assignee: G. N. Burgess Engineering Limited, United Kingdom

[21] Appl. No.: 930,458

[22] Filed: Nov. 14, 1986

[30] Foreign Application Priority Data

Nov. 15, 1985 [GB] United Kingdom ............... 8528261

[51] Int. Cl.$^4$ ............................................. F16J 15/38
[52] U.S. Cl. ....................................... 277/38; 277/41; 277/50; 277/93 R
[58] Field of Search ................................. 277/35–41, 277/50, 93 R, 93 SD

[56] References Cited

U.S. PATENT DOCUMENTS

| 2,203,525 | 6/1940 | Dupree | 277/38 X |
|---|---|---|---|
| 2,429,953 | 10/1945 | Bottomley . | |
| 2,586,739 | 2/1952 | Summers | 277/93 R X |
| 2,844,393 | 7/1958 | Jensen . | |
| 2,856,219 | 10/1958 | Kosatka | 277/38 |
| 3,116,066 | 12/1963 | Koppius | 277/38 |
| 3,655,205 | 4/1972 | Petersen | 277/93 R X |
| 3,782,735 | 1/1974 | Novosad . | |
| 4,216,972 | 8/1980 | Domes et al. . | |

FOREIGN PATENT DOCUMENTS

| 0134068 | 3/1985 | European Pat. Off. . |
|---|---|---|
| 7414842 | 12/1974 | Fed. Rep. of Germany . |
| 1027222 | 2/1953 | France . |
| 2269633 | 11/1975 | France . |
| 7414115 | 5/1975 | Netherlands . |
| WO80/00366 | 3/1980 | PCT Int'l Appl. . |
| 1515760 | 6/1978 | United Kingdom . |
| 2003998 | 3/1979 | United Kingdom . |
| 2044862 | 10/1980 | United Kingdom . |
| 2054067 | 2/1981 | United Kingdom . |
| 2115504 | 9/1983 | United Kingdom . |
| 2117064 | 10/1983 | United Kingdom . |

Primary Examiner—Robert S. Ward
Attorney, Agent, or Firm—Diller, Ramik & Wight

[57] ABSTRACT

A unitized face sealing device comprising first and second annular face sealing rings which can rotate relatively to each other and which have interengaging sealing faces, said rings being located within a unitizing casing, resilient means acting between one of the rings and said casing to apply an axial pressure between said sealing faces, and means for sealing said second ring to said casing said first sealing ring being located on an annular support which is adapted for an interference fit on a shaft, said support being axially spaced away from said second sealing ring and being retained and axially located by said casing.

26 Claims, 2 Drawing Sheets

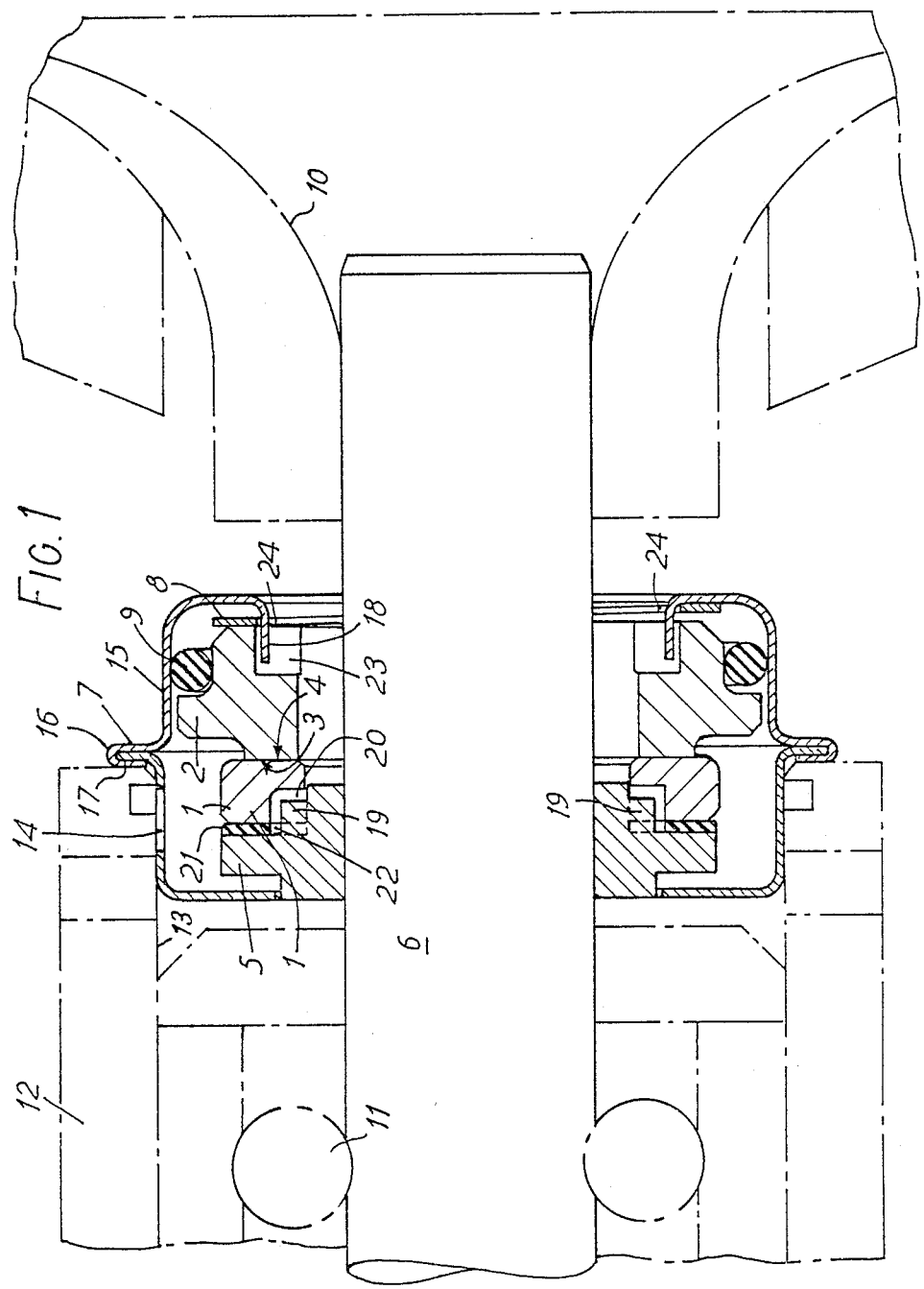

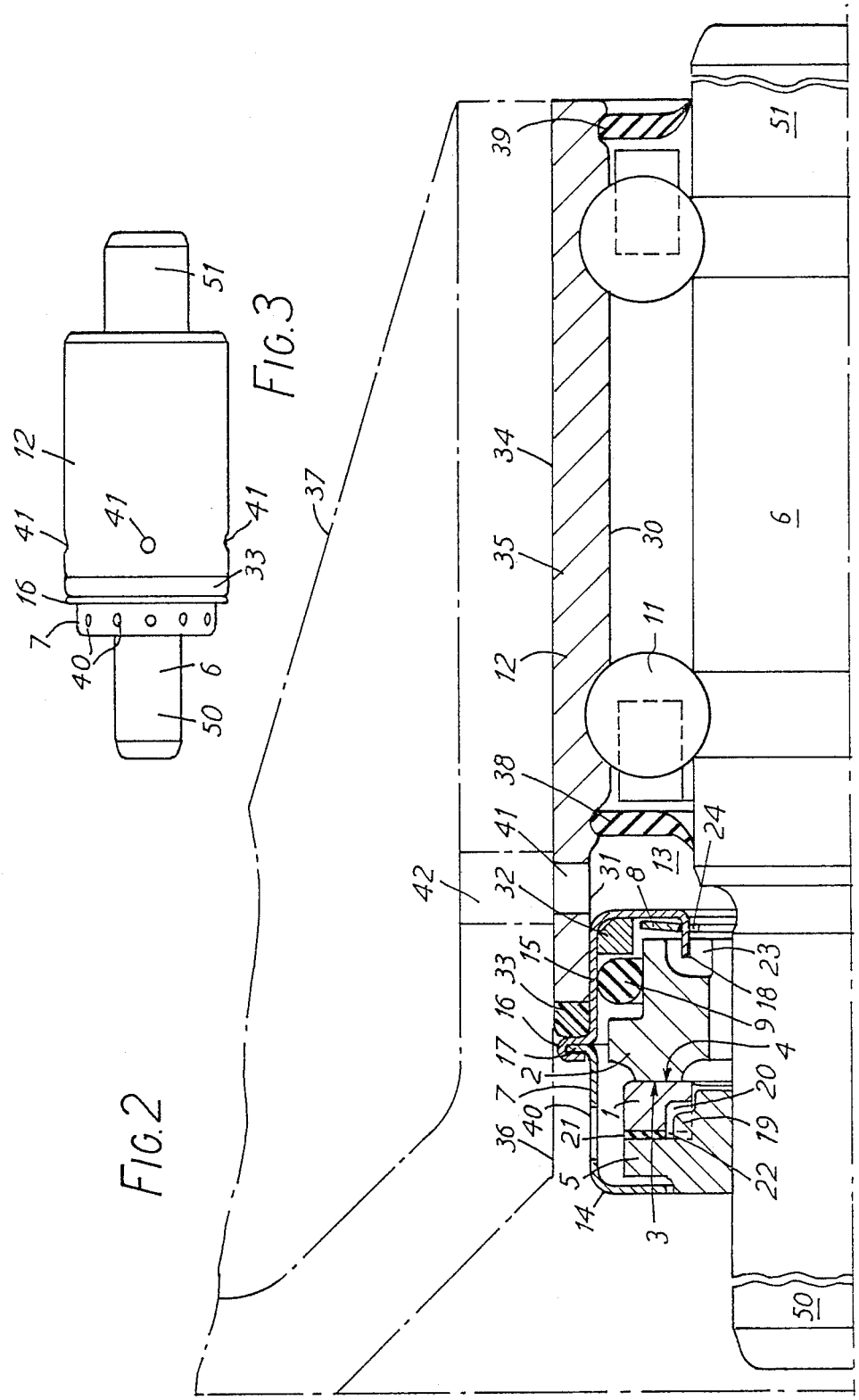

4,754,981

UNITIZED FACE SEALING DEVICE

This invention relates to a unitized face sealing device to be used to seal a rotatable shaft to a housing or casing. Such sealing devices are used, for example, to seal the rotatable shaft of a water pump to prevent liquid reaching the shaft bearing.

International Patent Application WO No. 80/00366 shows a unitized face seal for protecting bearings for use on highway construction equipment. In this device a pair of ring seals are maintained in face to face engagement by secondary elastomer seals and there is a unitized housing which maintains the sealing rings in alignment and maintains the annular resilient rings under compression. There in an inner housing shell which has an inner axially extending base wall which extends axially along the full length of the bearing device. A laminate of elastomer material is bonded to the shaft side of this base wall which aids in maintaining the wall in non-rotating engagement with the spindle.

Such a method of locating and holding a sealing device of this kind would be unsuitable in, for example, a water pump and are only applicable if there is a long surface area of contact with the shaft. It will be appreciated that the fixation is not as rigid as the use of an interference fit between the parts. It would however be difficult to utilize an interference fit in the construction shown in this Patent Specification due to the long axial length of the inner wall which would provioe problems during assembly.

According to the present invention a unitized face sealing device comprises first and second annular face sealing rings which can rotate relatively to each other and which have interengaging sealing faces, said rings being located within a unitizing casing, resilient means acting between one of the rings and said casing to apply an axial pressure between said sealing faces, and means for sealing said second ring to said casing, said first sealing ring being located on an annular support which is adapted for an interference fit on a shaft, said support being axially spaced away from said second sealing ring and being retained and axially located by said casing.

A further difficulty with the earlier construction referred to above is the lack of positive location between the elastomer annular resilient rings and the face sealing rings. In certain circumstances there could be movement due to the lack of positive location which could cause the rapid disintigration of the resilient rings and loss of sealing effect between the sealing faces.

Preferably therefore in the present invention means are also provided within the casing for positively locating the second ring against rotation relatively to the casing.

Positive drive means can also be provided between the first sealing ring and the annular support on which it is located.

The support can be arranged to act to radially and axially locate the first sealing ring and drive dogs can be provided which extend between the first sealing ring and the annular support to provide the positive drive.

The casing can be adapted to be an interference fit in a housing and may conveniently be made up from two annular shells fastened together on assembly, for example by crimping.

The annular support can have an axial length which is less than two thirds and is preferably less than half the axial length of the housing, and/or less than two thirds and preferably less than half of its own internal diameter.

The unitized sealing device can be constructed so that its outer casing is mounted at one end of a bore in a housing, said bore containing a bearing in which is located a shaft, one portion of which extends through the sealing device and beyond to provide a free end, and the other end portion of which protrudes freely from the other end of the housing.

Such a housing can be substantially cylindrical and the casing can be arranged to be an interference fit in the housing.

A resilient lip seal can be provided at the end of the housing spaced away from the unitized sealing device.

The invention can be performed in many ways and two embodiments will now be described by way of example and with reference to the accompanying drawings in which:

FIG. 1 is a sectional side elevation of a unitized face sealing device according to the invention located in a vehicle engine cooling system pump;

FIG. 2 is a part cross-sectional elevation of an alternative construction providing a unitized sealing device incorporated in a bearing housing provided with a bearing and shaft to provide an integrated assembly; and, FIG. 3 is a side elvation of the device shown in FIG. 2.

In the arrangement shown in FIG. 1 the unitized face sealing device comprises first and second annular face sealing rings 1 and 2 respectively which can rotate relatively to each other and which have interengaging sealing faces 3 and 4. The ring 1 is located on an annular support 5 which is axially spaced away from the sealing ring 4. The support 5 is of the kind sometimes referred to as a "unitizer" and is adapted to be an interference fit on a shaft 6.

The rings 1 and 2 are located within a unitizing casing 7 and resilient means 8 in the form of a wobbly spring act between the casing and the ring 2 to apply an axial pressure between the sealing faces 3 and 4. A sealing ring 9 acts to seal the second ring 2 to the casing 7.

In the construction being described the unitized face sealing device is utilised to seal a bearing in a water pump housing and thus the sealing device is mounted on the shaft 6 which has a diameter within the range 12.025 to 12.038 mm. An impeller, shown in broken lines 10, of a water pump for a water engine cooling system is attached to one end of the the shaft 6 which is supported in a bearing 11 in a housing indicated by broken lines 12. The face sealing device is located in the open end of a bore 13 in the housing 12 to prevent water entering the bore 13 and bearing 11.

The casing 7 comprises two cup shaped portions 14, 15 in the form of shells which are clamped together by bending an extended flange portion 16 on the portion 15 over and around a radially extending flange 17 on the portion 14. As the portion 14 is intended to be an interference fit in the housing 12 it is made to have an external diameter within the range 30.023 to 30.048 mm in the example being described. The portion 15 is provided with inwardly projecting tabs 18 to engage the second annular sealing ring 2 in a manner to be described.

The annular support 5 which, as referred to above, which is intended to be an interference fit on the shaft 6 is made from sintered metal powder so that it can be accurately made without further machining and is formed with a circumferential flange 18 to receive the first annular sealing ring 1. Diametrically opposed projecting dogs 19 are provided on the flange 18 which engage in recesses 20 on the first sealing ring 1 to ensure that the sealing ring and support 5 rotate together with the shaft 6.

The axial extent of the support 5, parallel to the axis of the shaft 6 is, in the example being described, in the range 5.05 to 5.25 mm, which is less than half the total axial length of the housing 7 which is within the range 14.00 to 14.10 mm. This axial length of the support 5 is also less than half of its own internal diameter. Thus, in the arrangement being described the support 5 or unitizer is much shorter where it engages the shaft than unitizers which have previously been used. Thus, in some of these earlier constructions the unitizer extends along the full axial length of the sealing device. The shorter length of the unitizer in the present construction allows for easier fitting of the device onto the shaft and this is an advantage with an interference fit.

The first annular sealing ring 1 which, in this kind of device, is sometimes referred to as a "counterface" is made of sintered metal powder or a ceramic material and the sealing face 3 is lapped. An annular resilient sealing spacer 21 is located between the support 5 and ring 1 and is provided with recesses 22 to engage over the dogs 19 so that it is held against rotation and also acts to cushion the support provided by the support 5 for the ring 1.

The second annular sealing ring 2 is made of sintered graphite. One side is lapped to provide the engaging face 4 and the other side is formed with recesses 23 to receive the tabs 18 on the housing member 15 so that the ring 2 is held against rotation by the housing. The O ring seal 9 is compressed between the ring 2 and the inner wall of the housing.

The two interengaging surfaces 3 and 4 are urged into contact by the spring 8 which is of the well known wavy spring type. Spaced inwardly projecting lugs 24 are provided on the spring so that it also locates on the tabs 18.

When in use water at the pressure generated by the impeller 10 enters the casing along the shaft 6 and has access to the interengaging surfaces 3 and 4 to lubricate them. As the water enters the casing along the shaft there is no great problem with solid particles in the water entering the casing and damaging the sealing faces as most such particles will be centrifuged outwardly before entering the casing 7.

The construction is such that the unitized face sealing device can be provided as a complete unit and is designed so that the support 5 can be pushed onto the shaft 6 with an interference fit, its short axial length assisting in this operation. When mounted the inner radially extending wall of the portion 14 of the casing locates on the support 5 and will be more closely adjacent to its radial wall than is shown in the drawing. The drawing is shown in this manner to make it more clear.

In order to assemble the device the various parts are put together, the two shells of the casing located appropriately and the flange 16 bent over the flange 17 and crimped together. This ensures a rigid casing. It will be appreciated that there are other ways of assembling such a casing but this particular construction provides a convenient outwardly projecting flange, formed by the crimped flanges 16 and 17 which can act as a stop when the device is placed in position in the housing 12.

FIGS. 2 and 3 show a sealing device somewhat similar to that shown in FIG. 1 incorporated in a housing carrying a shaft and bearing to provide an integrated assembly which can be placed as a unit in, for example, a vehicle water pump. The same reference numerals are used to indicate similar parts as in FIG. 1. In this construction however the sealing device is located in the housing 12 in the opposite direction, that is the portion 15 of the casing 7 is inserted in the bore 13 of the housing. In this construction it will be seen that the bore is stepped having a narrower part 30 and a wider portion 31 in which the sealing device is located. An additional ring 32 is located in the cup shaped portion 15 to assist in supporting the O ring seal 9 which is liable to compression due to hydraulic pressure. A ring 33 made from synthetic plastics material assists in providing a seal between the outer surface 34 of the housing 12 and the surface 35 of a bore 36 provided in a water pump housing 37, in which the housing 12 is an interference fit. This seal 33 also acts to locate the seal device appropriately within the housing. Annular lip seals 38, 39 are provided to further assist in sealing the bearing 11 and to prevent the ingress of foreign matter.

In order to allow water to enter the sealing device and lubricate the sealing surfaces 3 and 4 ports 40 are provided in the casing portion 14 and any water or condensation which occurs beyond the bearing device can escape through exit ports 41 in the housing 12 and further exit ports 42 in tne pump casing 37.

FIG. 3 shows the integrated assembly ready for insertion in a water pump and it will be seen that it comprises the unitized sealing device, the housing 12 carrying the bearing and the shaft 6 one portion 50 of which extends through the sealing device and beyond to provide a free end and the other end 51 of which protrudes freely from the other end of the housing 12. In the arrangement shown in FIGS. 2 and 3 the sealing ring 1 is on the pressure side of the seal provided by the rings 1 and 2 and care must therefore be taken in the choice of diameters of the parts concerned to ensure that the thrust of the water on the ring 2 does not displace it away from the ring 1.

I claim:

1. A unitized face sealing device comprising first and second annular face sealing rings which can rotate relatively to each other and which have interengaging sealing faces, said rings being located within a unitizing casing, resilient means acting between one of the rings and said casing to apply an axial pressure between said sealing faces, means for sealing said second ring to said casing, said first sealing ring being located on an annular support which is adapted for an interference fit on a shaft, and said annular support being axially spaced away from said second sealing ring and being retained and axially located by said casing.

2. A device as claimed in claim 1 in which means are also provided within the casing for positively locating said second ring against rotation relatively to the casing.

3. A device as claimed in claim 1 in which positive drive means are provided between said first sealing ring and said annular support on which it is located.

4. A device as claimed in claim 3 in which the support acts to radially and axially locate the first sealing ring.

5. A device as claimed in claim 3 in which drive dogs extend between the first sealing ring and the annular support.

6. A device as claimed in claim 3, in which an annular resilient spacer is located between the annular support and said first sealing ring.

7. A device as claimed in claim 2, in which the second sealing ring is positively retained against rotation relative to the housing by interengaging abutment members.

8. A device as claimed in claim 7 in which said abutment members also act to locate the resilient axial pressure means.

9. A device as claimed in claim 1, in which said resilient axial pressure means are provided by an annular "wavy" spring.

10. A device as claimed in claim 1 in which the second sealing ring is radially located in the housing by said sealing means.

11. A device as claimed in claim 1, in which the annular support has an axial length which is less than two thirds of the axial length of the housing, and/or less than two thirds of its own internal diameter.

12. A device as claimed in claim 11, in which the annular support has an axial length which is less than half the axial length of the housing and/or less than half of its own internal diamter.

13. A unitized sealing device as claimed in claim 1 wherein the casing is mounted at one end of a bore in a housing, said bore containing a bearing in which is located a shaft, one portion of which extends through the sealing device and beyond to provide a free end, and the other end portion of which protrudes freely from the other end of the housing.

14. A device as claimed in claim 13 in which the housing is substantially cylindrical.

15. A device as claimed in claim 13 in which the casing is an interference fit in the housing.

16. A device as claimed in claim 13 in which a resilient lip seal is provided at the end of the housing spaced away from tne unitized sealing device.

17. A device as claimed in claim 4 in which drive dogs extend between the first sealing ring and the annular support.

18. A device as claimed in claim 4 in which an annularresilient spacer is located between the annular support and said first sealing ring.

19. A device as claimed in claim 5 in which as annular resilient spacer is located between the annular support and said first sealing ring.

20. A device as claimed in claim 3 in which the second sealing ring is positively retained against rotation relative to the housing by interengaging abutment members.

21. A device as claimed in claim 4 in which the second sealing ring is positively retained against rotation relative to the housing by interengaging abutment members.

22. A device as claimed in claim 5 in which the second sealing ring is positively retained against rotation relative to the housing by interengaging abutment members.

23. A device as claimed in claim 6 in which the second sealing ring is positiviely retained against rotation relative to the housing by interengaging abutment members.

24. A device as claimed in claim 14 in which the casing is an interference fit in the housing.

25. A device as claimed in claim 14 in which a resilient lip seal is provided at the end of the housing spaced away from the unitized sealing device.

26. A device as claimed in claim 15 which a resilient lip seal is proveded at the end of the housing spaced away from the unitized sealing deivce.

* * * * *